(12) United States Patent
Chaussade et al.

(10) Patent No.: US 7,973,121 B2
(45) Date of Patent: Jul. 5, 2011

(54) METHOD OF PREPARING POLYORGANOSILOXANE WITH FUNCTIONAL GROUPS IN THE PRESENCE OF LITHIUM SILANOLATE

(75) Inventors: Marc Chaussade, Villeurbanne (FR); Nathalie Guennouni, Irigny (FR)

(73) Assignee: Bluestar Silicones France SAS, Lyon Cedex (FR)

( * ) Notice: Subject to any disclaimer, the term of this patent is extended or adjusted under 35 U.S.C. 154(b) by 618 days.

(21) Appl. No.: 11/792,375

(22) PCT Filed: Dec. 6, 2005

(86) PCT No.: PCT/FR2005/003044
§ 371 (c)(1),
(2), (4) Date: Aug. 25, 2008

(87) PCT Pub. No.: WO2006/061503
PCT Pub. Date: Jun. 15, 2006

(65) Prior Publication Data
US 2009/0099322 A1    Apr. 16, 2009

(30) Foreign Application Priority Data
Dec. 7, 2004 (FR) ...................................... 04 12977

(51) Int. Cl.
*C08G 77/26* (2006.01)
(52) U.S. Cl. .......................................... 528/34; 525/477
(58) Field of Classification Search ................ 528/34; 525/477
See application file for complete search history.

(56) References Cited

U.S. PATENT DOCUMENTS

| 3,878,263 A | * | 4/1975 | Martin .............................. 528/32 |
| 5,037,878 A | * | 8/1991 | Cerles et al. .................... 524/588 |
| 5,079,324 A | | 1/1992 | Cocco et al. |
| 5,663,269 A | | 9/1997 | Chu et al. |

FOREIGN PATENT DOCUMENTS
EP    0367696 B1    5/1990

* cited by examiner

*Primary Examiner* — Kuo-Liang Peng
(74) *Attorney, Agent, or Firm* — Buchanan Ingersoll & Rooney, P.C.

(57) ABSTRACT

The invention relates to a method of preparing polyorganosiloxanes containing at least one functional group using a lithium silanolate catalyst. A polyorganosiloxane, having at least one hydroxyl group, is reacted with a polyalkoxysilane having the formula $(R^1)_a(R^2)_b Si(OR^3)_{4-(a+b)}$ (I), where $R^1$ is an alkyl radical, a cycloalkyl radical, or an aryl radical; $R^2$ is —(Z)m-(X)n, wherein m=0 or 1, n=1 or 2; Z is a divalent hydrocarbon residue; X is an unsaturated hydrocarbon radical when m=0 and, when m=1, X is chlorine, bromine, iodine, —O—CO—$CR^4$=$CR^5R^6$ (in which $R^4$, $R^5$ and $R^6$ each represent a hydrogen atom, an alkyl radical and/or a phenyl radical), —$R^F$ (in which $R^F$ is a perfluorinated residue), —$NHR^7$ (in which $R^7$ is a hydrogen atom, an alkyl radical, or a radical-$R^8$—$NH_2$, wherein $R^8$ is Z), or —SH; $R^3$ is an alkyl radical; a=0, 1, 2 or 3; b=0 or 1 and a+b=0, 1, 2 or 3, with the additional condition that the sum a+b=3, symbol b cannot be equal to 0. The method is performed in the presence of an effective quantity of a lithium organosilanolate catalyst having formula $(R^1)_a(R^2)_b(OR^3)_{3-(a+b)}SiO^-Li^+$ (II), wherein $R^1$, $R^2$, $R^3$, a and b have the meanings indicated above. The method is performed without the addition of an aliphatic alcohol having the formula $R^3OH$ to the reaction medium.

8 Claims, No Drawings

METHOD OF PREPARING POLYORGANOSILOXANE WITH FUNCTIONAL GROUPS IN THE PRESENCE OF LITHIUM SILANOLATE

CROSS-REFERENCE TO PRIORITY/PCT APPLICATIONS

This application claims priority under 35 U.S.C. §119 of FR 0412977, filed Dec. 7, 2004, and is a continuation/national phase of PCT/FR 2005/003044, filed Dec. 6, 2005 and designating the United States (published in the French language on Jun. 15, 2006, as WO 2006/061503 A1; the title and abstract were also published in English), each hereby expressly incorporated by reference in its entirety and each assigned to the assignee hereof.

TECHNICAL FIELD OF THE INVENTION

The field of the invention, taken in its first subject, is that of the synthesis of polyorganosiloxane (oil and/or resin) containing in its structure at least one functional group, each functional group being linked to a silicon atom, polyorganosiloxane being referred to hereinbelow as FP (functionalized polymer).

The invention relates especially to a process for preparing polyorganosiloxane (oil and/or resin) containing in its structure at least one alkoxy group, each alkoxy group being linked to a silicon atom, this process consisting in reacting a polyorganosiloxane (oil and/or resin) containing in its structure at least one hydroxyl group, each hydroxyl group being linked to a silicon atom, with a functionalizing silane consisting of one or more polyalkoxysilane(s), working in the presence of a catalyst specific for this functionalization reaction based on a lithium silanolate that is advantageously obtained from the functionalizing silane.

The invention, taken in a second subject, is also directed toward novel compounds of lithium silanolate type used in this functionalization reaction.

The invention, taken in a third subject, is also directed toward the use of such compound(s) based on lithium silanolate(s) as catalyst for the functionalization reaction.

It is known practice to prepare these FPs by reacting, for example, a di-, tri- or tetraalkoxysilane with a polysiloxane oil comprising a hydroxyl group linked to the silicon atom at each end of the chain, but it is necessary to use a catalyst. Catalysts that may be used in particular include the following compounds:
- potassium acetate (cf. U.S. Pat. No. 3,504,051),
- various mineral oxides (cf. FR-A-1 495 011),
- carbamates (cf. EP-A-0 210 402),
- lithium hydroxide (cf. EP-A-0 367 696),
- sodium hydroxide or potassium hydroxide (cf. EP-A-0 457 693).

Among these catalysts, the one described in patent EP-A-0 367 696 is particularly advantageous since the starting materials required are relatively economic, especially the catalyst, which is lithium hydroxide (LiOH or $LiOH.H_2O$). This prior art quite rightly points out the simplicity of the process, the relative harmlessness of the catalyst with regard to the cleavage of silicone oil chains (in contrast especially with the potassium hydroxide) and a fast functionalization reaction, which is especially complete in less than 5 to 10 minutes.

The silanes used are silanes comprising several alkoxy functions, for instance ethyl silicate $Si(OCH_2CH_3)_4$, methyltrimethoxysilane or vinyltrimethoxysilane. When the silane comprises at least three alkoxy functions, and without this being the only possible use, the oils and resins thus functionalized may be used, after neutralizing the catalyst with lithium hydroxide, in the preparation of one-pack mastics that release an alcohol on use. Patent EP-A-0 367 696 proposes an example of such a use (cf. example 7); thus, the following are loaded, with stirring:
- 100 g of an α, ω-dihydroxypolydimethylsiloxane with a viscosity of 20 Pa·s,
- 5 g of vinyltrimethoxysilane, and
- 0.005 g of $LiOH.H_2O$ as a 10% solution by weight in methanol (i.e. 0.045 g of methanol).

After a reaction time of 5 minutes, 0.064 g of neutralizing solution is introduced. Next, 3 g of silane β-aminoethyl-γ-aminopropyltrimethoxysilane, 0.05 g of dibutyltin dilaurate, 105 g of calcium carbonate treated with stearic acid and 8 g of treated fumed silica are added. The product obtained is stored protected from moisture and shows good storage.

In the above example, the lithium hydroxide is introduced into the methanol in order to increase its efficacy. The reason for this is that it is very difficult to disperse lithium hydroxide in powder form in silicone. It has been observed that lithium hydroxide is soluble in methanol up to a proportion of about 10% by weight when it is in the form $LiOH.H_2O$.

The amount of methanol used, due to the physicochemical characteristics of this solvent, may give rise to serious drawbacks in terms of hygiene and industrial safety.

Furthermore, to limit the degradation phenomena in relation to the presence of methanol, it is necessary to add to the process a step of stirring under vacuum in order to remove this methanol, and this step is particularly critical as regards the quality of the finished product. The consequences are manifold, the main ones of which are the following:
1. loss of productivity associated with this additional phase;
2. risk of poorer conservation on storage of the finished product in the event of poor control of the evaporation step;
3. need to develop a new process for recovery of the volatile matter evolved;
4. risk of evaporation of the volatile starting materials (especially the low molecular weight silanes).

Moreover, it is particularly difficult to replace methanol with another solvent since it is necessary for that solvent to be:
- a solvent for lithium hydroxide,
- sufficiently soluble in the silicone,
- nontoxic and nondegrading for the mastic and inactive with respect to the application properties of the mastic (especially in terms of color, viscosity and adhesion).

Any solvent that does not have these three characteristics cannot replace methanol.

AIM OF THE INVENTION

With such a prior art, the Applicant has now found, and this is what constitutes the field of the Invention taken in its various subjects, a novel use of lithium hydroxide that eliminates the drawbacks listed above (associated with the introduction of an aliphatic alcohol, for instance methanol) and opens the way for the following advantages:
- optimum productivity,
- improved control of the quality of the mastic,
- elimination of the evaporation of volatile matter,
- control of the composition of the mastic (elimination of the risk of loss of volatile matter during manufacture).

According to yet another advantage, it has been observed that the stability of the FPs prepared in accordance with the novel use of lithium hydroxide is substantially higher when the process is performed in accordance with the present invention, compared with what happens when working in accordance with the teaching of EP-A-0 367 696.

More specifically, it has been found that the above-mentioned advantages are achieved by using lithium hydroxide in the form of a lithium organosilanolate, which results from the reactive dissolution, in a preliminary step, of lithium hydroxide in the functionalizing silane(s).

DESCRIPTION OF THE PRESENT INVENTION

I—The present invention, taken in its first subject, thus relates firstly to a process for preparing polyorganosiloxane containing in its structure at least one functional group, each functional group being linked to a silicon atom, which consists in reacting a polyorganosiloxane containing in its structure at least one hydroxyl group, each hydroxyl group being linked to at least one silicon atom, with, per silanol unit ($\equiv$Si—OH), at least 1 mol and preferably 2 to 30 mol of at least one polyalkoxysilane of formula:

$$(R^1)_a(R^2)_b Si(OR^3)_{4-(a+b)} \qquad (I)$$

in which:
R$^1$ represents: a linear or branched $C_1$-$C_{10}$ alkyl radical; a $C_5$-$C_{10}$ cycloalkyl radical; a $C_6$-$C_{18}$ aryl radical;
R$^2$ represents a functional group of formula:

$$—(Z)_m—(X)_n$$

with:
m=0 or 1;
n=1 or 2;
Z represents a divalent or trivalent $C_1$-$C_{30}$ hydrocarbon-based residue possibly containing one or more oxygen heteroatom(s), of the type such as: linear or branched, saturated or unsaturated aliphatic residue, cyclanic residue, aromatic residue, mixed aliphatic/aromatic residue;
X, when m=0, represents an unsaturated $C_2$-$C_6$ hydrocarbon-based radical containing a double bond and optionally another double bond possibly conjugated to the first, of the type such as: linear or branched aliphatic residue, cyclanic residue;
X, when m=1, represents a residue chosen from those of formula: chlorine, bromine or iodine atom; —O—CO—CR$^4$=CR$^5$R$^6$ in which R$^4$, R$^5$ and R$^6$, which may be identical or different, each represent: a hydrogen atom, a $C_1$-$C_6$ alkyl radical and/or a phenyl radical; —R$^F$ in which R$^F$ represents a perfluoro residue, for instance the radical —$C_pF_{2p}$—$CF_3$ (p equal to 0 or other than 0) or the radical —$C_pF_{2p'}$—H (p' equal to 1 or greater than 1); —NHR$^7$ in which R$^7$ represents a hydrogen atom, a linear or branched $C_1$-$C_6$ alkyl radical or a radical —R$^8$—NH$_2$ in which the symbol R$^8$ represents Z; —SH; R$^3$ represents a linear or branched $C_1$-$C_4$ alkyl radical;
a=0, 1, 2 or 3;
b=0 or 1;
a+b=0, 1, 2 or 3, with the additional condition according to which when the sum a+b=3, the symbol b cannot be a number equal to 0;
working in the presence of an effective amount of a catalyst based on a lithium derivative,
said process being characterized by the following points:
said catalyst is a compound consisting essentially of a lithium organosilanolate of formula:

$$(R^1)_a(R^2)_b(OR^3)_{3-(a+b)} SiO^- Li^+ \qquad (II)$$

in which the symbols R$^1$, R$^2$, R$^3$, a and b have the meanings given above;

said process is performed in the absence of an aliphatic alcohol of formula R$^3$OH added to the reaction medium.

The expression "polyorganosiloxane containing in its structure at least one functional group" is intended to define, for the purposes of the present invention, a polyorganosiloxane containing in its structure at least one group chosen from the groups OR$^3$ and R$^2$ as defined above.

The expression "polyalkoxysilane of formula (I)" is intended to denote a silane of this type taken alone or as a mixture with oligomers resulting from its partial hydrolysis, followed by a polycondensation.

II—The present invention, taken in its second subject, relates to novel compounds based on a lithium derivative, which may be used especially as catalysts in the synthesis of FPs, characterized in that they are compounds consisting essentially of lithium organosilanolates of formula (II) in which the symbols R$^1$, R$^2$, R$^3$, a and b have the meanings given above.

Compounds consisting essentially of lithium organosilanolates of formula (II) are obtained by reacting lithium hydroxide with at least one functionalizing silane of formula (I), working at room temperature (i.e. in the region of 25° C.), under an anhydrous atmosphere and at atmospheric pressure.

As regards the lithium hydroxide used, it is widely commercially available. Its formula is LiOH or LiOH.H$_2$O. LiOH.H$_2$O is preferably used, which corresponds to the stabilized form of lithium hydroxide.

In the process for preparing the silanolates, per mole of lithium hydroxide, generally at least 1 mol and preferably 1.5 to 10 mol of polyalkoxysilane(s) of formula (I) are used.

The silanolates are thought to be formed in the following manner:

$$(R^1)_a(R^2)_b Si(OR^3)_{4-(a+b)} + LiOH.H_2O \rightarrow (R^1)_a(R^2)_b (OR^3)_{3-(a+b)} SiO^- Li^+ + R^3OH + H_2O$$

When LiOH.H$_2$O is used, it is preferable to work in an excess of silane; the excess silane then acts as solvent and makes it possible, if need be, to consume by hydrolysis the water formed according to the reaction scheme given above.

It should be noted that the process for preparing silanolates that has just been described may also be successfully performed for the preparation of a compound consisting essentially of a lithium organosilanolate of formula (II) in which the symbol b is equal to 0 and the sum a+b is equal to 3.

III—The present invention, taken in its third subject, also relates to the use of an effective amount of at least one compound consisting essentially of a lithium organosilanolate of formula (II) as catalyst for the preparation of polyorganosiloxane containing in its structure at least one functional group, each functional group being linked to a silicon atom, via a process that consists in reacting a polyorganosiloxane containing in its structure at least one hydroxyl group, each hydroxyl group being linked to at least one silicon atom, with, per silanol unit, at least 1 mol and preferably from 2 to 20 mol of at least one polyalkoxysilane of formula:

$$(R^1)_a(R^2)_b Si(OR^3)_{4-(a+b)} \qquad (I)$$

in which the symbols R$^1$, R$^2$, R$^3$, a and b have the meanings given above.

The expression "effective amount of catalyst" means an amount such that the reaction rate is appreciably improved and that the reaction temperature is as close as possible to room temperature (25° C.). Generally, from 0.001 to 3 mol, preferably from 0.001 to 2 mol and even more preferentially from 0.005 to 1 mol of compound consisting essentially of lithium silanolate are used relative to 1$\equiv$Si—OH unit of the polyorganosiloxane containing in its structure at least one hydroxyl group.

DETAILED DESCRIPTION OF THE PREFERENTIAL MODES OF THE PRESENT INVENTION

Preferably:

the polyorganosiloxanes containing in their structure at least one functional group consist of essentially linear diorganopolysiloxanes comprising at least one functional group at each end of the chain, of formula:

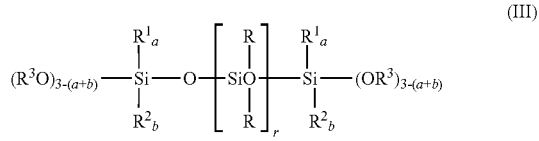
(III)

and the polyorganosiloxanes containing in their structure at least one hydroxyl group consisting of essentially linear diorganopolysiloxanes comprising at least one hydroxyl group at each end of the chain, of formula:

(IV)

in which formulae: $R^1$, $R^2$, $R^3$, a and b have the same meanings as those given above for the silane of formula (I); the radicals R, which may be identical or different, each represent a linear or branched $C_1$-$C_{10}$ alkyl radical, a $C_5$-$C_{10}$ cycloalkyl radical or a linear or branched $C_2$-$C_6$ alkenyl radical; r has a value sufficient to give the polymers of formulae (III) and (IV) a viscosity of from 10 to 1 000 000 mpa·s at 25° C., it being understood that the polysiloxane of formula (III) may have a mean formula in which the value of r is higher or lower than the value of r in the polysiloxane of formula (IV) that reacts with the silane of formula (I).

The polymers of formula (e) (III) and/or (IV) may also have in their structure monoorganosiloxyl units $RSiO_{3/2}$ and/or units $SiO_2$ in a proportion of not more than 3% relative to the number of diorganosiloxyl units $R_2SiO_{2/2}$ The radicals of the types $R^1$ and R mentioned above especially comprise:
  alkyl radicals containing from 1 to 10 carbon atoms, such as methyl, ethyl, isopropyl, butyl, pentyl, hexyl, 2-ethylhexyl, octyl or decyl radicals;
  cycloalkyl radicals containing from 5 to 10 carbon atoms, such as cyclopentyl, cyclohexyl, methylcyclohexyl or propylcyclohexyl radicals;
  alkenyl radicals containing from 2 to 6 carbon atoms, such as vinyl, allyl and 2-butenyl radicals;
  mononuclear or polynuclear aryl radicals containing from 6 to 18 carbon atoms, such as phenyl, tolyl, xylyl, naphthyl or phenanthryl radicals.

As concrete examples of units $R_2SiO$ present in the polysiloxane of formula (e) (III) and/or (IV), mention may be made of:

$(CH_3)_2SiO$, $CH_3(CH_2\!\!=\!\!CH)SiO$, $CH_3(C_6H_5)SiO$, $(C_6H_5)_2SiO$.

It should be understood that, in the process according to the present invention, a mixture consisting of α, ω-di(hydroxy)diorganopolysiloxane polymers that differ from each other in the molecular weight and/or the nature of the groups attached to the silicon atoms may be used as polymer of formula (IV).

The residues Z mentioned above comprise, for example:
a linear or branched divalent alkylene radical containing from 1 to 15 carbon atoms, the free valency of which is borne by a carbon atom and is linked to a silicon atom, said radical possibly being interrupted in the alkylene chain with at least one oxygen heteroatom, such as the radicals: —$(CH_2)_2$—, —$(CH_2)_3$—, —$(CH_2)_4$, —$CH_2$—$CH(CH_3)$—, —$(CH_2)_2$—$CH(CH_3)$—$CH_2$—, —$(CH_2)_3$—O—$(CH_2)_3$, —$(CH_2)_3$—O—$CH_2$—CH($CH_3$)—$CH_2$—, —$(CH_2)_3$—O—$CH_2CH(OH)$—$CH_2$—, cyclohexylene;
a divalent aromatic radical chosen from: -phenylene(ortho, meta or para)-alkylene(linear or branched $C_2$-$C_6$)—, -phenylene(ortho, meta or para)-O-alkylene (linear or branched $C_2$-$C_6$)—, -alkylene(linear or branched $C_2$-$C_6$)-phenylene(ortho, meta or para)-alkylene(linear or branched $C_1$-$C_6$) and alkylene (linear or branched $C_2$-$C_6$)-phenylene(ortho, meta or para)-O-alkylene(linear or branched $C_1$-$C_6$)—.

Preferably, Z represents a —$(CH_2)_2$— or —$(CH_2)_3$— radical.

Among the polyalkoxysilanes of formula (I) that may be used in the present invention, mention will preferably be made of the functionalizing silanes of formula (I) in which:
  $R^1$ is chosen from the group of methyl, ethyl and phenyl radicals;
  $R^2$ is chosen from the group of radicals of formulae:

—CH=$CH_2$,

—$CH_2$—Cl, —$(CH_2)_3$—Cl,

—$CH_2$—O—CO—C(H or $CH_3$)=$CH_2$, —$(CH_2)_3$—O—CO—C(H or $CH_3$)=$CH_2$,

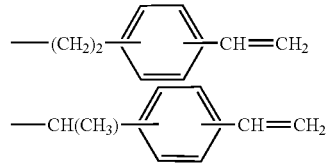

or mixtures of these vinylarylalkyl radicals,

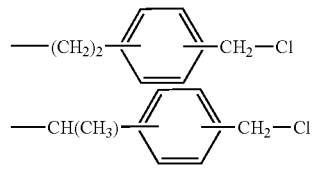

mixtures of these chloroalkylarylalkyl radicals,
—$(CH_2)_3$—$NH_2$, —$(CH_2)_3$—NH— $(CH_2)_2$—$NH_2$, —$(CH_2)_3$—SH,
  $R^3$ is chosen from methyl and ethyl radicals,
  a=0, 1 or 2,
  b=0 or 1,
  a+b=0, 1 or 2.

Specially preferred polyalkoxysilanes that will be mentioned include the following compounds:
tetramethoxysilane (TMO),
tetraethoxysilane (TEO),
tetrapropoxysilane,
methyltrimethoxysilane (MTMO),
methyltriethoxysilane (MTEO),
propyltrimethoxysilane (PrTMO),
propyltriethoxysilane (PrTEO),
phenyltrimethoxysilane (PhTMO),
phenyltriethoxysilane (PhTEO),
vinyltrimethoxysilane (VTMO),
vinyltriethoxysilane (VTEO),
3-chloropropyltrimethoxysilane,
[2-(o,m,p-chloromethylphenyl)ethyl]trimethoxysilane,
[1-(o,m,p-chloromethylphenyl)ethyl]trimethoxysilane and mixtures thereof,
3-aminopropyltrimethoxysilane,
3-aminopropyltriethoxysilane,
[3-(2-aminoethyl)aminopropyl]trimethoxysilane,
3-mercaptopropyltrimethoxysilane,
3-methacryloxypropyltrimethoxysilane,
3-acryloxypropyltrimethoxysilane.

As regards compounds consisting essentially of lithium organosilanolates of formula (II) that may be used in the present invention, reference will preferably be made to the compounds consisting essentially of lithium silanolates of formula (II) in which the symbols $R^1$, $R^2$, $R^3$, a and b have the meanings given above with regard to the definition of the preferred functionalizing silanes.

Specially preferred catalysts that will be mentioned include the compounds consisting essentially of lithium silanolates corresponding to the specially preferred functionalizing silanes listed above.

As regards the preparation of the compounds consisting essentially of lithium silanolates, this preparation is performed in the absence of moisture, for example in a closed reactor equipped with a stirrer, in which the air may be replaced, if need be, with an anhydrous gas, for example with nitrogen.

This preparation is generally performed at room temperature (25° C.), working by stirring the required reagents for a time ranging, for example, from a few minutes to several hours; as a guide, the time is in practice in the range from 5 minutes to 10 hours or more. The reaction is considered as complete when the lithium hydroxide has been completely consumed; the reaction mixture is then clear or very slightly cloudy.

As regards the preparation of the functional polyorganosiloxanes of formula (III) that consists in reacting the hydroxylated polyorganosiloxanes of formula (IV) with the silanes of formula (I), this process is also performed in the absence of moisture, for example in a closed reactor equipped with a stirrer, in which the air may be replaced, if need be, with an anhydrous gas, for example with nitrogen.

The reagents and the catalyst are loaded into the reactor. The reaction is generally performed at a temperature in the range from 0 to 50° C., preferably ranging from 20 to 40° C. The functionalization process is performed for a period of time (ranging, for example, from 30 seconds to 60 minutes) sufficient to perform a full functionalization reaction or a reaction as close as possible to the maximum degree of functionalization accessible under the selected operating conditions.

When the functionalization reaction is complete, the next stage involves, and these are optional measures that it is, however, preferable to perform, neutralization of the catalyst and devolatalization of the reaction mass obtained in order to remove therefrom the alcohol formed during the functionalization reaction and any excess functionalizing silane.

Example of a Field of Application of Functional Polyorganosiloxanes:

Functional polyorganosiloxanes, in particular diorganopolysiloxanes comprising at least two alkoxy groups at each chain end, obtained according to the process of the present invention taken in its first subject, may advantageously be used for the preparation of one-pack polysiloxane compositions that are stable on storage in the absence of moisture and that crosslink to elastomer (which may also be referred to as mastics) in the presence of moisture.

For example, these compositions are obtained by adding (by weight) to 100 parts of the functionalized polymer of formula (III) prepared in accordance with the process of the invention:
  0 to 250 parts of mineral filler(s),
  0 to 15 parts of polyalkoxysilane(s) of formula (I),
  0 to 20 parts and preferably 0 to 10 parts of at least one additive chosen from the following ingredients: adhesion agents; essentially linear, unreactive diorganopolysiloxanes; antifungal agents; bactericides; inert organic diluents (for instance: toluene, xylene, heptane, white spirit, trichloroethylene or tetrachloroethylene); hydrocarbon-based plasticizers; thixotropic agents,
  an effective amount of coupling catalyst; the term "effective amount of coupling catalyst" means, for example, from 0.001 to 5 parts by weight and preferably from 0.001 to 2 parts of at least one compound of a metal chosen from tin, titanium and zirconium, and mixtures thereof.

For further details regarding the definition of the one-pack polysiloxane compositions, reference may be made especially to the following patents: EP-A-0 367 696, EP-A-0 457 693, EP-A-1 141 131.

Coupling catalysts that may be used include tin monocarboxylates and dicarboxylates such as tin 2-ethyl-hexanoate, dibutyltin dilaurate or dibutyltin diacetate (see Noll's book "Chemistry and Technology of Silicone", page 337, Academic Press, 1968-2nd edition).

Hexacoordinate chelates of tin of valency IV such as those described in European patent application EP-A-147 323 and U.S. Pat. No. 4,517,337 cited as reference are particularly suitable.

Coupling catalysts that are a mixture of a diorganotin bis (β-diketonate) with an organotin derivative, also of valency IV, but free of β-diketonato function, and containing at least one tin atom, each tin atom bearing two organic radicals linked via an Sn—C bond, the other two valencies being satisfied by means of radicals chosen from organic or inorganic radicals linked via an SnO or SnS bond, via halogen atoms, via hydroxyl groups and via oxygen atoms, are also preferred.

The mineral fillers are used in a proportion of from 0 to 250 parts by weight and preferably from 5 to 200 parts per 100 parts by weight of FP of formula (III).

These fillers may be in the form of very finely divided products with a mean particle diameter of less than 0.1 micrometer. Among these fillers are fumed silicas and precipitation silicas; their BET specific surface area is generally greater than 40 $m^2/g$.

These fillers may also be in the form of more coarsely divided products, with a mean particle diameter of greater than 0.1 micrometer. Examples of such fillers that may be mentioned include ground quartz, diatomaceous silicas, calcium carbonate, calcined clay, titanium oxide of rutile type, iron oxide, zinc oxide, chromium oxide, zirconium oxide or magnesium oxide, the various forms of alumina (hydrated or nonhydrated), boron nitride, lithopone, barium metaborate, barium sulfate and glass microbeads; their specific surface area is generally less than 30 m²/g.

These fillers may have been surface-modified by treatment with the various organosilicon compounds usually used for this purpose. Thus, these organo-silicon compounds may be organochlorosilanes, diorganocyclopolysiloxanes, hexaorganodisiloxanes, hexaorganodisilazanes or diorganocyclopolysiloxanes (French patents FR-A-1 126 884, FR-A-1 136 885, FR-A-1 236 505; British patent GB-A-1 024 234). The treated fillers contain, in the majority of cases, from 3% to 30% of their weight of organosilicon compounds.

The fillers may consist of a mixture of several types of fillers of different particle size; thus, for example, they may consist of 30% to 70% of finely divided silicas with a BET specific surface area of greater than 40 m²/g and from 70% to 30% of more coarsely divided silicas with a specific surface area of less than 30 m²/g.

Preferably, the adhesion agent, when one is used, is chosen from organosilicon compounds bearing both (1) hydrolysable groups linked to the silicon atom and (2) organic groups substituted with radicals chosen from the group of amino, isocyanato, epoxy, alkenyl and isocyanurate radicals.

The examples that follow illustrate the present invention.

EXAMPLE 1

1) Preparation of the Catalyst 19.25 g of vinyltrimethoxysilane (VTMO) and 0.80 g of lithium hydroxide (LiOH.H₂O) are introduced into a 25 ml glass flask containing a magnetic bar. The flask is sealed and the medium is left stirring for 15 hours. A clear solution is obtained.

A spectrum is acquired by IR microscopy on a sample that has been devolatilized beforehand to remove the excess vinyltrimethoxysilane introduced. A solid is thus obtained. The spectrum obtained on the sample is compatible with the simultaneous presence of SiOMe functions (2843 cm⁻¹), SiVi functions (3051 cm⁻¹) and SiOLi functions (990, 758 and 667 cm⁻¹).

2) Functionalization

The following are successively introduced at room temperature and with moderate stirring (80 rpm) into a 250 ml five-necked flask equipped with a mechanical stirrer, an ascending condenser and a temperature probe:
  polydimethylsiloxane oil blocked with hydroxysilyl groups HO[Me₂SiO]₄₅H, 100.73 g (60.2×10⁻³ mol of SiOH function),
  vinyltrimethoxysilane (VTMO) ViSi(OMe)₃, 23.74 g (160×10⁻³ mol).
The symbol Vi denotes the vinyl radical: CH₂=CH—; the symbol Me denotes the methyl radical.

The lithium silanolate in solution in VTMO (3.83 g of the solution prepared in paragraph 1, i.e. 3.64×10⁻³ mol of lithium silanolate, i.e. 0.06 mol of lithium silanolate per mole of silanol) is then introduced at 21° C. The clear medium becomes slightly cloudy and the temperature rises by 5° C.

After stirring for 3 minutes, a sample of 7.78 g of the reaction medium is taken and immediately neutralized with acetic acid (0.27 g of a toluene solution of acetic acid at 5.24% by weight, i.e. 2.35×10⁻⁴ mol of acid or 1.04 mol of acid function per mole of silanolate).

²⁹Si-NMR analysis performed in CDCl₃ on the crude medium shows that the functionalization is complete.

| Type of signal | D(OH) | D | $T^{Vi}(OR)_3$ | $T^{Vi}(OR)_2$ |
|---|---|---|---|---|
| δ (ppm) | −11.0 | −22.0 | −55.2 | −63.6 |
| mol % | 0 | 88 | 8 | 4 |

The structure of the oil obtained is as follows:

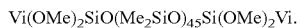

Vi(OMe)₂SiO(Me₂SiO)₄₅Si(OMe)₂Vi.

The rest of the reaction medium is left for a further 90 minutes. ²⁹Si-NMR analysis performed after neutralization does not reveal any degradation of the silicone chain.

EXAMPLE 2

1) Preparation of the Catalyst 18.57 g of tetraethoxysilane (TEO) and 0.79 g of lithium hydroxide (LiOH.H₂O) are introduced into a 25 ml glass flask containing a magnetic bar. The flask is sealed and the medium is left stirring for 15 hours. A clear solution is obtained.

2) Functionalization

The following are successively introduced at room temperature and with moderate stirring (80 rpm) into a 250 ml five-necked flask equipped with a mechanical stirrer, an ascending condenser and a temperature probe:
  polydimethylsiloxane oil blocked with hydroxysilyl groups HO[Me₂SiO]₄₅H, 100.05 g (59.8×10⁻³ mol of SiOH function),
  tetraethoxysilane (TEO) (EtO)₄Si, 34.19 g (164×10⁻³ mol).
The symbol Et denotes the ethyl radical.
The symbol Vi denotes the vinyl radical: CH₂=CH—; the symbol Me denotes the methyl radical.

The lithium silanolate in solution in TEO (3.68 g of the solution prepared in paragraph 1, i.e. 3.58×10⁻³ mol of lithium silanolate, i.e. 0.06 mol of lithium silanolate per mole of silanol) is then introduced at 24° C. The temperature of the medium increases slightly and rises to 25° C.

Samples are taken over time at 3, 9, 20 and 90 minutes to monitor the reaction progress.

Each sample is immediately neutralized with acetic acid (1.04 mol of acid function per mole of silanolate) by using a toluene solution of acetic acid at 5.24% by weight.

²⁹Si-NMR analysis performed in CDCl₃ on each of the samples shows that the functionalization is complete after 9 minutes of reaction.

| Type of signal | D(OH) | D | $Q(OR)_4$ | $Q(OR)_3$ |
|---|---|---|---|---|
| δ (ppm) | −11.0 | −22.0 | −81.8 | −88.1 |
| mol % | 0 | 90.5 | 5.5 | 4 |

The structure of the oil obtained is as follows:

(OEt)₃SiO(Me₂SiO)₄₅Si(OEt)₃.

The rest of the reaction medium is left for a further 90 minutes. ²⁹Si-NMR analysis performed after neutralization does not reveal any degradation of the silicone chain.

EXAMPLE 3

1) Preparation of the Catalyst 19.19 g of phenyltrimethoxysilane (PhTMO) and 0.81 g of lithium hydroxide (LiOH.H$_2$O) are introduced into a 25 ml glass flask containing a magnetic bar. The flask is sealed and the medium is left stirring for 15 hours. A clear solution is obtained.

2) Functionalization

The following are successively introduced at room temperature and with moderate stirring (80 rpm) into a 250 ml five-necked flask equipped with a mechanical stirrer, an ascending condenser and a temperature probe:
polydimethylsiloxane oil blocked with hydroxysilyl groups HO[Me$_2$SiO]$_{45}$H, 100.42 g (60.8×10$^{-3}$ mol of SiOH function),
phenyltrimethoxysilane (PhTMO), PhSi(OMe)$_3$, 32.08 g (161.8×10$^{-3}$ mol).
The symbol Ph denotes the phenyl radical.
The lithium silanolate in solution in PhTMO (3.66 g of the solution prepared above in paragraph 1, i.e. 3.54×10$^{-3}$ mol of lithium silanolate, i.e. 0.06 mol of lithium silanolate per mole of silanol) is then introduced at 27° C. The clear medium becomes slightly cloudy with formation of a white foam that disappears quickly. The temperature rises by 3° C.

After stirring for 3 minutes, a sample of 9.10 g of the reaction medium is taken and immediately neutralized with acetic acid (0.29 g of a 5.24% acetic acid solution, i.e. 2.53×10$^{-4}$ mol of acid or 1.04 mol of acid function per mole of silanolate).

$^{29}$Si-NMR analysis performed in CDCl$_3$ on each of the samples shows that the functionalization is complete after 3 minutes of reaction.

| Type of signal | D(OH) | D | T$^{Ph}$(OR)3 | T$^{Ph}$(OR)2 |
|---|---|---|---|---|
| δ (ppm) | −11.0 | −22.0 | −54.5 | −62.7 |
| mol % | 0 | 91 | 5 | 4 |

The structure of the oil obtained is as follows:

Ph(OMe)$_2$SiO(Me$_2$SiO)$_{45}$Si(OMe)$_2$Ph.

The rest of the reaction medium is left for a further 90 minutes. $^{29}$Si-NMR analysis performed after neutralization does not reveal any degradation of the silicone chain.

EXAMPLE 4

Another Example of Functionalization of Silicone Oils

Preparation 0:
The following are successively added to a container:
100 parts by weight of an α, ω-dihydroxylated polydimethylsiloxane oil with a viscosity of 136 Pa·s at 25° C., and
3 parts by weight of vinyltrimethoxysilane (VTMO).
These constituents are intimately mixed and the preparation is then divided between two containers.
Preparation 1 (According to the Prior Art):
0.5 g of a solution of hydrated lithium hydroxide (LiOH.H$_2$O) at 3.85% by weight in methanol is added to 100 g of the mixture described above. The composition is then stirred for 20 seconds at 1000 rpm, and then twice in succession for 15 seconds at 2000 rpm in a stirring machine such as the Speedmixer DAC150 from Hauschild.
The chronometer is then started.
Preparation 2 (According to the Present Invention):
0.5 g of a solution of hydrated lithium hydroxide (LiOH.H$_2$O) at 3.85% in VTMO (i.e. 0.458×10$^{-3}$ mol of lithium silanolate or 0.008 mol of silanolate per 1 SiOH function) is added to 100 g of preparation 0 and mixed according to the same protocol. This solution, although being clearly yellow, does not color the final mixture. This yellow color is associated with the presence of the vinyl groups, since a solution of lithium hydroxide in methyltrimethoxysilane at the same concentration does not have this coloration. The solubility in the silane of the lithium silanolate generated as an intermediate is largely sufficient to achieve the intended concentration.

The second chronometer is started.
Results:
The two preparations are stored in a sealed flask at 25° C. and samples are taken at regular intervals to measure the viscosity at 23° C.

TABLE 1

| Time (in minutes) | Preparation 1 | Preparation 2 |
|---|---|---|
| 20 | 131 | |
| 25 | | 126 |
| 35 | 126 | 125 |
| 65 | 121 | 124 |
| 1020 | 81 | 82 |
| 1440 | 58.1 | 75.5 |
| 2460 | 38.6 | 62.5 |

Comments:
Insofar as the compositions of the two preparations are slightly different, the slight difference in viscosity at the first measurement cannot be interpreted as a greater degradation of Preparation 2. On the other hand, for longer storage times, the reduction in viscosity over time is markedly greater as regards Preparation 1 than for Preparation 2.

It is concluded that replacing VTMO with methanol is a stabilizing factor for the preparation.

COMPARATIVE EXAMPLE

Preparation of a Control Mastic with Functionalization of the Hydroxylated Silicone Oil, Working in the Presence of a Solution of Lithium Hydroxide in Methanol 425 g of α, ω-dihydroxylated polydimethylsiloxane oil ("hydroxylated silicone oil") with a viscosity of about 135 000 mPa·s (i.e. 7.5×10$^{-3}$ mol of SiOH function), 48 g of α, ω-trimethylsilyl polydimethylsiloxane oil ("blocked" oil) with a viscosity of about 100 000 mPa·s, 116 g of α, ω-trimethylsilyl polydimethylsiloxane oil with a viscosity of about 100 mPa·s and 22 g of vinyltrimethoxysilane crosslinking agent (148.6×10$^{-3}$ mol) are placed, at 25° C., in the tank of a uniaxial butterfly mixer.

The whole is mixed at 200 rpm for 2 minutes, and 2.8 g of a solution of hydrated lithium hydroxide (LiOH.H$_2$O) at 3.85% by weight in methanol are introduced into the tank. The functionalization reaction is allowed to take place over 4 minutes with stirring at 400 rpm, and then 44 g of fumed silica with a specific surface area of 150 m$^2$/g and 525 g of calcium carbonate are incorporated at a moderate stirring speed (160 rpm) and then more vigorously (4 minutes at 400 rpm) to complete the dispersion in the mixture.

About 10 g of a preparation comprising an amino silane and a tin polycondensation catalyst is then added. After mixing for 4 minutes at 400 rpm, the stirring speed is reduced to 130 rpm and the mixture is degassed for 9 minutes at $40 \times 10^2$ Pa. The preparation is then stored protected from air until the time of use.

EXAMPLE 5

Preparation of a Mastic with Functionalization of the Hydroxylated Silicone Oil, Working in the Presence of Lithium Silanolate The protocol of the above comparative example is repeated, but replacing, at 25° C., the 2.8 g of solution of lithium hydroxide in methanol with the compound consisting essentially of lithium silanolate resulting from the reaction of lithium hydroxide with VTMO contained in 1.2 g of a solution of hydrated lithium hydroxide at 11.9% by weight in VTMO (i.e. $3.4 \times 10^{-3}$ mol of lithium silanolate or 0.45 mol of silanolate per mole of SiOH function).

EXAMPLE 6

Preparation of a Mastic with Functionalization of the Hydroxylated Silicone Oil, with Reduction of the Degassing Time The protocol of example 5 is repeated, but the degassing is performed for 3 minutes instead of 9 minutes as in the comparative example and example 5.

Results:

The hardnesses (Shore A measurements on thicknesses of 6 mm consisting either of a slug or of 3 superposed films of 2 mm, according to the indications of standard ASTM-D-2240) of the three mastics are compared in table 2 below.

For each mastic, a hermetically sealed cartridge was stored in an oven at 50° C. for 3 weeks to evaluate the stability on storage of the cartridge at room temperature. The hardness is measured on 3 superposed films of 2 mm after different crosslinking times.

TABLE 2

|  | Comparative example | Example 5 | Example 6 |
|---|---|---|---|
| Hardness 3 × 2 mm after 7 days | 24 | 22.5 | 22.5 |
| Setting after maturation for 3 weeks at 50° C. | | | |
| Hardness 3 × 2 mm after 1 day | 6.5 | 12 | 13 |
| Hardness 3 × 2 mm after 2 days | 12 | 17 |  |
| Hardness 3 × 2 mm after 7 days | 18.5 | 22 | 21.5 |
| Loss of hardness 7 days | −23% | −2% | −4.4% |

Notes:
all the crosslinkings are performed in a conditioned room at 23° C./50% RH;
the loss of hardness is the relative difference in hardness between the hardness at 7 days of the mastic conditioned for 3 weeks at 50° C. and of the initial measurement.

Comments:

Table 2 above clearly shows a difference in stability between the comparative example and the other two examples 5 and 6: loss of 23% of the initial hardness after the maturation experiment in the comparative example, as compared with only 2 to 4% for the other two examples 5 and 6.

The elimination of methanol during the functionalization thus leads to greater stability of the mastic. It should be noted that the reduction in the degassing time does not weaken the stability of the mastic as shown in example 6, which means that it is possible to achieve a gain in productivity and to reduce the amount of volatile matter extracted from the mastic.

The invention claimed is:

1. A process for preparing a polyorganosiloxane containing in its structure at least one functional group, where each functional group is linked to a silicon atom, comprising reacting a polyorganosiloxane containing in its structure at least one hydroxyl group, where each hydroxyl group is linked to at least one silicon atom, with, per silanol unit (≡Si—OH), at least 1 mol of at least one functionalizing polyalkoxysilane of formula:

$$(R^1)_a(R^2)_b Si(OR^3)_{4-(a+b)} \quad (I)$$

in which:
R$^1$ is a linear or branched C$_1$-C$_{10}$ alkyl radical; a C$_5$-C$_{10}$ cycloalkyl radical; or a C$_6$-C$_{18}$ aryl radical;
R$^2$ is a functional group of formula:

$$-(Z)_m-(X)_n$$

where:
m=0 or 1;
n=1 or 2;
Z is a divalent or trivalent C$_1$-C$_{30}$ hydrocarbon-based residue optionally containing one or more oxygen atoms, said residue comprising a linear or branched, a saturated or unsaturated aliphatic residue, a cyclanic residue, an aromatic residue, or a mixed aliphatic/aromatic residue;
X, when m=0, is an unsaturated linear or branched aliphatic or cyclanic C$_2$-C$_6$ hydrocarbon-based radical containing a double bond and optionally another double bond optionally conjugated to the first double bond;
X, when m=1, is a member of the group selected from the group consisting of a chlorine atom, a bromine atom an iodine atom; —O—CO—CR$^4$=CR$^5$R$^6$ in which R$^4$, R$^5$ and R$^6$, which may be identical or different, are each a hydrogen atom, a C$_1$-C$_6$ alkyl radical and/or a phenyl radical; the radical —C$_p$F$_{2p}$—CF$_3$ (p equal to 0 or other than 0); the radical —C$_p$F$_{2p'}$—H (p' equal to 1 or greater than 1); —NHR$^7$ in which R$^7$ is a hydrogen atom, a linear or branched C$_1$-C$_6$ alkyl radical or a radical —R$^8$—NH$_2$ in which the symbol R$^8$ is Z; and —SH;
R$^3$ is a linear or branched C$_1$-C$_4$ alkyl radical;
a=0, 1, 2 or 3;
b=0 or 1;
a+b=0, 1, 2 or 3, with the additional condition according to which when the sum a+b=3, the symbol b cannot be a number equal to 0;
wherein said reaction occurs in the presence of an effective amount of a catalyst consisting essentially of a lithium organosilanolate of formula:

$$(R^1)_a(R^2)_b(OR^3)_{3-(a+b)}SiO^-Li^+ \quad (II)$$

in which the symbols R$^1$, R$^2$, R$^3$, a and b have the meanings given above; and
said process is performed in the absence of an aliphatic alcohol of formula R$^3$OH added to the reaction medium.

2. The process for preparing a polyorganosiloxane as defined by claim 1, wherein from 0.001 to 3 mol of said lithium organosilanolate are used relative to one ≡Si—OH unit of the polyorganosiloxane containing in its structure at least one hydroxyl group.

3. The process for preparing a polyorganosiloxane as defined by claim 1, wherein:

the polyorganosiloxanes containing in their structure at least one functional group consist of essentially linear diorganopolysiloxanes comprising at least one functional group at each end of the chain, of formula:

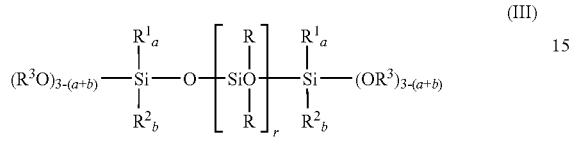
(III)

and the polyorganosiloxanes containing in their structure at least one hydroxyl group consisting of essentially linear diorganopolysiloxanes comprising at least one hydroxyl group at each end of the chain, of formula:

(IV)

in which formulae $R^1$, $R^2$, $R^3$, a and b have the same meanings as those given above for the silane of formula (I); the radicals R, which may be identical or different, each represent a linear or branched $C_1$-$C_{10}$ alkyl radical, a $C_5$-$C_{10}$ cycloalkyl radical or a linear or branched $C_2$-$C_6$ alkenyl radical; and r has a value sufficient to give the polymers of formulae (III) and (IV) a viscosity of from about 10 to about 1,000,000 mPa·s at 25° C.

4. The process for preparing a polyorganosiloxane as defined by claim 1, wherein the functionalizing polyalkoxysilane is selected from the silanes of formula (I) in which:

$R^1$ is selected from the group consisting of methyl, ethyl and phenyl radicals;

$R^2$ is selected from the group consisting of radicals of formulae:

—CH═$CH_2$,

—$CH_2$—Cl,

—$(CH_2)_3$—Cl,

—$CH_2$—O—CO—CH═$CH_2$,

—$CH_2$—O—CO—C($CH_3$)═$CH_2$,

—$(CH_2)_3$—O—CO—CH═$CH_2$,

—$(CH_2)_3$—O—CO—C($CH_3$)═$CH_2$,

-continued

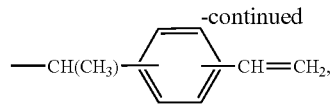

mixtures of these vinylarylalkyl radicals,

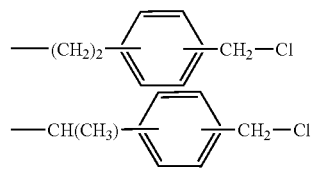

mixtures of these chloroalkylarylalkyl radicals,

—$(CH_2)_3$—$NH_2$,

—$(CH_2)_3$—NH—$(CH_2)_2$—$NH_2$, and

—$(CH_2)_3$—SH, $R^3$ is a methyl or ethyl radical, a=0, 1 or 2, b=0 or 1, a+b=0, 1 or 2.

5. The process for preparing polyorganosiloxane as defined by claim 4, wherein the functionalizing polyalkoxysilane is selected from the group consisting of:

tetramethoxysilane (TMO),
tetraethoxysilane (TEO),
tetrapropoxysilane,
methyltrimethoxysilane (MTMO),
methyltriethoxysilane (MTEO),
propyltrimethoxysilane (PrTMO),
propyltriethoxysilane (PrTEO),
phenyltrimethoxysilane (PhTMO),
phenyltriethoxysilane (PhTEO),
vinyltrimethoxysilane (VTMO),
vinyltriethoxysilane (VTEO),
3-chloropropyltrimethoxysilane,
[2-(o,m,p-chloromethylphenyl)ethyl]trimethoxysilane, and mixtures thereof,
[1-(o,m,p-chloromethylphenyl)ethyl]trimethoxysilane, and mixtures thereof
3-aminopropyltrimethoxysilane,
3-aminopropyltriethoxysilane,
[3-(2-aminoethyl)aminopropyl]trimethoxysilane,
3-mercaptopropyltrimethoxysilane,
3-methacryloxypropyltrimethoxysilane,
3-acryloxypropyltrimethoxysilane, and
mixtures thereof.

6. The process for preparing polyorganosiloxane as defined by claim 1, wherein the catalyst consisting essentially of a lithium organosilanolate of formula (II) has the following definitions for $R^1$, $R^2$, $R^3$, a and b:

$R^1$ is selected from among the group consisting of methyl, ethyl and phenyl radicals;

$R^2$ is selected from among the group consisting of radicals of formulae:

—CH═$CH_2$,

—$CH_2$—Cl,

—$(CH_2)_3$—Cl,

—CH₂—O—CO—CH=CH₂,

—CH₂—O—CO—C(CH₃)=CH₂,

—(CH₂)₃—O—CO—CH=CH₂,

—(CH₂)₃—O—CO—C(CH₃)=CH₂,

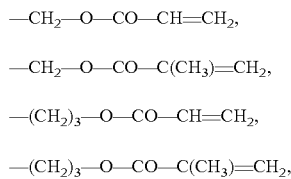

mixtures of these vinylarylalkyl radicals,

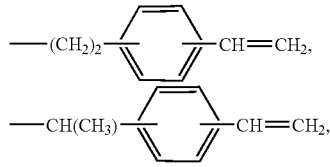

mixtures of these chloroalkylarylalkyl radicals,

—(CH₂)₃—NH₂,

—(CH₂)₃—NH—(CH₂)₂—NH₂, and

—(CH₂)₃—SH,

R³ is a methyl or ethyl radical,
a=0, 1 or 2,
b=0 or 1, and
a+b=0, 1 or 2.

7. The process for preparing polyorganosiloxane as defined by claim 6, wherein the organosilane portion of the lithium silanolate catalyst is selected from the group consisting of:
tetramethoxysilane (TMO),
tetraethoxysilane (TEO),
tetrapropoxysilane,
methyltrimethoxysilane (MTMO),
methyltriethoxysilane (MTEO),
propyltrimethoxysilane (PrTMO),
propyltriethoxysilane (PrTEO),
phenyltrimethoxysilane (PhTMO),
phenyltriethoxysilane (PhTEO),
vinyltrimethoxysilane (VTMO),
vinyltriethoxysilane (VTEO),
3-chloropropyltrimethoxysilane,
[2-(o,m,p-chloromethylphenyl)ethyl]trimethoxysilane, and mixtures thereof
[1-(o,m,p-chloromethylphenyl)ethyl]trimethoxysilane and mixtures thereof,
3-aminopropyltrimethoxysilane,
3-aminopropyltriethoxysilane,
[3-(2-aminoethyl)aminopropyl]trimethoxysilane,
3-mercaptopropyltrimethoxysilane,
3-methacryloxypropyltrimethoxysilane, and
3-acryloxypropyltrimethoxysilane.

8. The process for preparing of claim 1, wherein the catalyst consisting essentially of a lithium organosilanolate of formula (II) is prepared by reacting lithium hydroxide with at least one functionalizing silane of formula (I)

$$(R^1)_a(R^2)_b Si(OR^3)_{4-(a+b)} \qquad (I)$$

in which the symbols R¹, R² and R³ have the meanings as defined by claim 1, and in which a=0, 1, 2 or 3, b=0 or 1 and the sum a+b=0, 1, 2 or 3, where said reaction is performed at room temperature, under an anhydrous atmosphere and at atmospheric pressure.

* * * * *